US010768308B2

(12) United States Patent
Derbez et al.

(10) Patent No.: US 10,768,308 B2
(45) Date of Patent: Sep. 8, 2020

(54) RECEIVER INTEGRITY MONITORING USING DOPPLER ANALYSIS

(71) Applicant: iPosi, Inc., Denver, CO (US)

(72) Inventors: Eric Derbez, Vancouver (CA); Christopher Neil Kurby, Streamwood, IL (US)

(73) Assignee: iPosi, Inc., Denver, CO (US)

( * ) Notice: Subject to any disclaimer, the term of this patent is extended or adjusted under 35 U.S.C. 154(b) by 0 days.

(21) Appl. No.: 15/899,020

(22) Filed: Feb. 19, 2018

(65) Prior Publication Data

US 2019/0025437 A1   Jan. 24, 2019

Related U.S. Application Data

(60) Provisional application No. 62/461,075, filed on Feb. 20, 2017.

(51) Int. Cl.
```
G01S 19/20    (2010.01)
G01S 19/25    (2010.01)
G01S 19/21    (2010.01)
G01S 19/22    (2010.01)
G01S 19/29    (2010.01)
```
(52) U.S. Cl.
CPC .............. G01S 19/20 (2013.01); G01S 19/21 (2013.01); G01S 19/22 (2013.01); G01S 19/25 (2013.01); G01S 19/29 (2013.01)

(58) Field of Classification Search
CPC ................................................ G01S 19/20–22
See application file for complete search history.

(56) References Cited

U.S. PATENT DOCUMENTS

| 6,646,596 B2 * | 11/2003 | Syrjarinne | G01S 5/02 342/357.25 |
| 7,800,533 B2 * | 9/2010 | Harper | G01S 19/215 342/357.58 |
| 2010/0302030 A1 * | 12/2010 | Yamada | G01S 19/42 340/539.13 |
| 2012/0021698 A1 | 1/2012 | Borlez | |
| 2013/0154879 A1 | 6/2013 | Ramakrishnan | |
| 2014/0097984 A1 | 4/2014 | Stevens | |
| 2014/0354477 A1 | 12/2014 | Robinson | |

FOREIGN PATENT DOCUMENTS

KR   1020140133396   11/2014

* cited by examiner

*Primary Examiner* — Cassi J Galt
(74) *Attorney, Agent, or Firm* — Holzer Patel Drennan (57) ABSTRACT

Wave based signals such as radio transmissions are susceptible to frequency alterations caused by the relative movement between a transmitter and a receiver. In a satellite context, the radio signals emitted by a satellite based transmitter may take on a frequency higher or lower than the actual frequency at which they are generated depending on whether the satellite is moving toward or away from the receiver, respectively. By calculating the theoretical frequency shift (Doppler shift) that should occur if a signal travels directly from a satellite to a receiver, the actual frequency of the signal as received can be used to determine if the signal's integrity is sufficient or if it has been compromised by some sort of interference or malfunction.

6 Claims, 8 Drawing Sheets

```
                              ┌501    ┌502           ┌503             ┌504
                              ▼       ▼              ▼                ▼
        RAIM PRN 32    res 306.751070 dopRes 4.793043 bias 3708.10
        RAIM PRN 23    res 454.110954 dopRes 3.610900 bias 3896.10
        RAIM PRN 20    res 466.586977 dopRes 4.797667 bias 3844.85
        RAIM PRN 11    res 466.895838 dopRes 2.487664 bias 3852.28
        RAIM PRN 31    res 315.530838 dopRes 4.801153 bias 3992.29
        RAIM PRN 22    res 459.128519 dopRes 4.794004 bias 3817.17
        RAIM PRN 23 32 res 340.188316 dopRes 3.841237 bias 3727.55
        RAIM PRN 20 32 res 328.130905 dopRes 5.329524 bias 3663.49
        RAIM PRN 20 23 res 507.683349 dopRes 3.859949 bias 3898.49
        RAIM PRN 11 32 res 333.735784 dopRes 2.748613 bias 3672.77
        RAIM PRN 11 23 res 507.040269 dopRes 0.696251 bias 3907.77
        RAIM PRN 11 20 res 521.653857 dopRes 2.738762 bias 3843.71
        RAIM PRN 31 32 res 141.590889 dopRes 5.350243 bias 3847.79
        RAIM PRN 31 23 res 288.957650 dopRes 4.024318 bias 4082.80
        RAIM PRN 31 20 res 347.785436 dopRes 5.354736 bias 4018.73
        RAIM PRN 31 11 res 343.613436 dopRes 2.433777 bias 4028.01
        RAIM PRN 22 32 res 293.684341 dopRes 5.324308 bias 3628.89
        RAIM PRN 22 23 res 502.577579 dopRes 3.845025 bias 3863.89
        RAIM PRN 22 20 res 511.854465 dopRes 5.330851 bias 3799.83
        RAIM PRN 22 11 res 513.004731 dopRes 2.746766 bias 3809.11
        RAIM PRN 22 31 res 352.302049 dopRes 5.351186 bias 3984.13
        RAIM PRN 20 23 32 res 378.245775 dopRes 4.062229 bias 3674.56
        RAIM PRN 11 23 32 res 384.322645 dopRes 0.747547 bias 3686.93
        RAIM PRN 11 20 32 res 358.044724 dopRes 3.094631 bias 3601.51
506─▶   RAIM PRN 11 20 23 res 585.308541 dopRes 0.771840 bias 3914.85
        RAIM PRN 31 23 32 res 75.525504  dopRes 4.371040 bias 3920.30
        RAIM PRN 31 20 32 res 161.441581 dopRes 6.150946 bias 3834.88
        RAIM PRN 31 20 23 res 306.937118 dopRes 4.395965 bias 4148.21
505─▶   RAIM PRN 31 11 32 res 163.491500 dopRes 2.659440 bias 3847.25
        │RAIM PRN 31 11 23 res 295.163351 dopRes 0.045958 bias 4160.59│
        RAIM PRN 31 11 20 res 385.397913 dopRes 2.634171 bias 4075.17
        RAIM PRN 22 23 32 res 339.116192 dopRes 4.036839 bias 3628.43
        RAIM PRN 22 20 32 res 292.398707 dopRes 6.089235 bias 3543.01
        RAIM PRN 22 20 23 res 580.130168 dopRes 4.068540 bias 3856.34
        RAIM PRN 22 11 32 res 305.592656 dopRes 3.107022 bias 3555.38
        RAIM PRN 22 11 23 res 580.246330 dopRes 0.752953 bias 3868.72
        RAIM PRN 22 11 20 res 590.113446 dopRes 3.091642 bias 3783.30
        RAIM PRN 22 31 32 res 113.069667 dopRes 6.145353 bias 3788.75
        RAIM PRN 22 31 23 res 331.422130 dopRes 4.376081 bias 4102.08
        RAIM PRN 22 31 20 res 401.566755 dopRes 6.152368 bias 4016.67
        RAIM PRN 22 31 11 res 396.765303 dopRes 2.654603 bias 4029.04
```

RECEIVER INTEGRITY MONITORING USING DOPPLER ANALYSIS

RELATED APPLICATIONS

This application is a non-provisional of U.S. Application No. 62/461,075 entitled "RECEIVER INTEGRITY MONITORING USING DOPPLER ANALYSIS", which was filed on Feb. 20, 2017, the entirety of which is incorporated by reference herein.

BACKGROUND

The Global Positioning System (GPS) is the US version of a Global Navigation Satellite System (GNSS). Throughout this disclosure, the generic term GNSS, the specific term GPS, or the combination GPS/GNSS may be used and such references shall refer to any such system, including GPS, GLONASS (Russian), Galileo (European), Indian Regional Navigation Satellite System (IRNSS), BeiDou-2 (Chinese), or other such comparable system.

Many modern electronic and consumer devices include a GNSS receiver that can determine the absolute position of the device (e.g., in latitude, longitude, and altitude relative to a global coordinate system) via the GNSS system. GNSS receivers determine their position with high precision (within a few meters) by receiving positioning signals transmitted along a line-of-sight by radio (e.g., RF signals) from a plurality of satellites that are "visible" to the receiver. Receipt of a sufficient number of signals (e.g., four or more) also allows receivers to calculate the current local time to high precision, which allows for time synchronization without the use of costly high precision oscillators as discussed in more detail below.

One difficulty encountered in traditional GNSS systems is that GNSS systems require a direct path from each satellite used in a location and time synchronization solution to the GNSS receiver in order to compute an optimum solution. Timing data associated with the moment at which a signal is transmitted is encoded into the signal. At the receiver, the timing data associated with the time at which the signal was sent is compared to the time at which the signal is received. By analyzing the travel time, the receiver can determine a distance (i.e., pseudo-range) between it and the transmitter.

In traditional GNSS systems, at least three simultaneous direct path signals from a corresponding number of space vehicles (SVs) must be received to compute a location solution if absolute GPS time is known at the receiver. However, rarely does the receiver have access to a high precision time source (e.g., a synchronized and highly precise oscillator), in which case four simultaneous GNSS signals may be required to provide for geolocation in three dimensions and to correct for any timing bias at the receiver. Timing bias occurs in GNSS receivers due to a number of factors including, for example, a concept known as oscillator drift that occurs when the timing mechanism associated with the receiver trends out of synchronization with an absolute time reference. For example, the oscillation frequency of a quartz crystal may increase or decrease with atmospheric conditions, which may lead to discrepancies between a local clock and the absolute time reference. When the clocks of a transmitter and receiver are not synchronized, the travel time of signals between satellites and receivers cannot be properly determined and errors in geolocation occur. Specifically, as a result of oscillator drift, the travel time may be incorrectly determined, which in turn leads to calculation of an incorrect distance between the transmitter and receiver (pseudo-range). A common goal in GNSS systems is reducing oscillator drift, but this often requires prohibitively expensive time-keeping technology which is impractical in most applications.

In some outdoor environments, where there are no obstacles (e.g., on an open highway) it may be relatively easy to establish line-of-sight with a sufficient number of satellites to correct for biases. Further, in some light building structures (e.g., residential houses composed largely of wood) the GNSS signals may (1) be only mildly attenuated, so that the received signal strength is above the sensitivity of the GNSS receiver, and (2) have an ideal, direct, and thus un-delayed path from the satellite to the receiver. In this case the signal rays are undistorted in time; that is, they have the same propagation time as a true line-of-sight (LOS) path and they can be used to provide an accurate location for the receiver.

However, in some environments, signals may be distorted by a variety of factors. For instance, a signal which is reflected off of a surface prior to being receive at the receiver is likely to experience a delay in arriving at the receiver due to the increased distance traveled. This delay is likely to be interpreted by the receiver as a greater straight-line distance between the transmitter and the receiver than actually exists. In such an instance, a reflected signal has low integrity for accurate geolocation.

Furthermore, atmospheric conditions can delay a signal en route from a transmitter to a receiver (e.g., ionospheric dispersion). Water vapor and other airborne matter can affect its perceived transit time. Similar to the reflection problem described above, this is likely to cause the receiver to calculate an incorrect distance between it and the transmitter.

In some rare situations, a satellite transmitter may malfunction, causing it to send incorrect timing data, identification data, ephemeris data, almanac data, etc. In this situation, those described above, or a variety of other scenarios, the data received at a receiver may have low integrity and is unreliable for calculating timing and/or distance. Therefore it may be desirable to discard or correct signals which suggest low integrity.

SUMMARY

In view of the foregoing, it is presently recognized that receivers may receive radio signals which have compromised integrity due to any number of factors. Identification of these low-integrity signals may be useful to improve location accuracy of a receiver that receives positioning system signals. In this regard, a receiver may omit low-integrity signals when calculating its location so as not to use inaccurate data, or it may analyze a low-integrity signal to determine an appropriate means of correcting biases associated therewith.

Previous technologies have proposed use of receiver autonomous integrity monitoring (RAIM) which requires an over-determined system (e.g., 5 signals) in order to evaluate the integrity of individual ones of signals. This technique relies upon calculating a pseudo-range for each signal. In turn, a position of the receiver is calculated using various ones of the pseudo-ranges and a residual error for each solution. Solutions with high residual errors may be used to identify an outlier among the signals. This process requires complex calculations which may be time-consuming and costly. Moreover, it requires a surplus of signals such that a sufficient number of visible transmitters (e.g., 4 or more signals) remain when one or more potential low-integrity signals are removed from the geolocation calculations. In a situation in which multiple signals have low integrity, the previously proposed solutions may be unable to determine which of the signals are low-integrity. Consequently, the system may return an unreliable position and/or time.

In contrast, the present application utilizes Doppler values of positioning system signals received at a receiver to identify a signal that has low integrity using a procedure which shall be referred to herein as Doppler RAIM. The Doppler effect of waveforms is a well-known phenomenon related to the relative movement of a transmitter in relation to a receiver (e.g., sound waves from a moving ambulance siren). Given a known location and trajectory of a satellite (e.g., from GPS almanac and ephemeris data) and an assumed position of a receiver (i.e., an a priori location), the Doppler RAIM technique described herein is performed by calculating an expected frequency at which a signal is expected to be received from a transmitter based upon an expected Doppler shift (meaning the change in frequency due to the Doppler effect) and comparing that expected frequency with an actual frequency at which the signal is received. Any difference in the expected versus actual frequencies may be indicative of a low-integrity signal.

Advantageously, the Doppler RAIM technique may be performed on a single signal rather than requiring a surplus of signals as with traditional RAIM techniques. Doppler RAIM also may be operative to determine that more than one signal has low integrity. Furthermore, the calculations required to perform the method may be relatively simple in comparison to previously proposed solutions. In this regard, Doppler RAIM may provide accurate determination of low-integrity signals while requiring less processing capacity, thus resulting in reduced equipment costs and faster results.

Generally speaking, each GNSS receiver may generate pseudo-ranges and correlation values associated with one or more GNSS satellites. By comparing the ascertained values, a receiver may be able to identify a signal (or even multiple signals) with compromised integrity. Such a low-integrity signal, once identified, may be excluded from geolocation processing to determine the receiver's location. By excluding a signal with an indication of low integrity, a more accurate position of the receiver may be obtained.

As mentioned above, receiver autonomous integrity monitoring of previously proposed solutions required an over-determined system (e.g., at least 5 signals) in order to identify even a single low-integrity signal. These techniques center around calculating a receiver's position using various subsets of transmitters and then determining potential outliers based on residual errors relative to an a priori location. For example, if a receiver currently has visibility of satellites A, B, C, D, and E, it may calculate its position using each subset combination of signals (e.g., ABCD, ABCE, BCDE, etc.) by calculating a pseudo-range to each transmitter. If the positional determination using all subsets which include signal B, for example, are significantly different than the other subsets (i.e., have higher residual errors), the receiver may assume that signal B is unreliable. In this regard, these previously proposed solutions rely upon the calculated pseudo-ranges in order to determine if one of those pseudo-ranges appears incorrect, thereby indicating that a signal has low integrity. An incorrect pseudo-range may be identified by calculating a residual error to an estimated, predicted, or assumed position.

A method of the present disclosure uses the Doppler effect to assess signal integrity rather than relying upon a comparison of pseudo-ranges as in previously proposed solutions. Just as with sound waves, radio waves are also subject to the Doppler effect. Thus, as a transmitter (e.g., a satellite) is moving toward a receiver (e.g., a GNSS device), the radio signal will be perceived at a higher frequency than it is actually being transmitted. The difference between the transmission frequency (e.g., 1500 Hz) and the perceived frequency at the transmitter (e.g., 1600 Hz) is generally referred to as Doppler shift (e.g., +100 Hz).

One aspect of the present invention utilizes the Doppler shift of a signal to assess the integrity of the signal. In this regard, the receiver receives ephemeris and almanac data from a satellite. Using this data, and a given time, the receiver may determine a position and velocity of the satellite at that time. The receiver also receives information regarding the frequency at which the satellite is broadcasting. Furthermore, the receiver also has an a priori location (that may be estimated, assumed, or otherwise provided). Such an a priori location may be acquired through any appropriate means. For example, with a stationary receiver installed in or on a building, an a priori location may be programmed into the receiver during setup or installation. A receiver may also acquire an a priori location from a local network, the internet, etc. In the context of a mobile receiver, an a priori location may correspond to a previously calculated position.

Given that a receiver may have information regarding the location, velocity, and broadcast frequency of the transmitter, the receiver may determine an expected Doppler value indicative of a frequency at which the signal from that satellite is anticipated to be received at the assumed a priori location of the receiver, taking into consideration the Doppler shift. The expected Doppler value, as used herein, may refer to the expected absolute frequency or the expected shift in frequency. When the signal is received, the receiver may identify an actual Doppler value indicative of the frequency at which the signal was actually received. Actual Doppler value may refer to the actual absolute frequency at which the signal is received or the actual shift in frequency. By comparing the expected Doppler value to the actual Doppler value, the receiver may assess the integrity of the signal and determine whether it satisfies a threshold value such that the signal may be deemed trustworthy for calculating location. Notably, a threshold value may be above zero, which would represent that a minor discrepancy may be expected and permitted.

Advantageously, only minor differences in Doppler shift are perceived at different geographic locations separated by relatively significant geographic distances. This is because one component of the Doppler effect is the angle between the trajectory of the transmitter and the line of sight path of the signal. Given the large distance between a satellite transmitter and a receiver near the Earth's surface, this angle may be substantially the same at one location as compared to another location some distance away (e.g., 1 km). As a result, the perceived frequency at one location, may be substantially the same as the perceived frequency 1 km away. In turn, the method may be relatively insensitive to error in the a priori location.

Importantly, with traditional RAIM techniques utilizing pseudo-range comparisons, a 1 km error in the location of the receiver would be detrimental and the results would be unreliable. This is because geometric dilution of precision (GDOP) may mask or amplify errors in low-integrity signals making them difficult, if not impossible, to identify. Additionally, a substantial number of iterations of location calculations may be needed to effectively hone in on the correct location of the receiver. In contrast, using Doppler shift as in the present technique, the a priori location of a receiver may be off by 1 km or more and the technique may still yield reliable results. In part, this is because an a priori location of a stationary receiver is likely to be relatively accurate which results in fewer iterations of calculations being needed. As iterations of the calculations are performed, the oscillator drift bias may be effectively compensated for and the location of the receiver may be pinpointed with a high degree of accuracy and precision, even with fewer visible satellites than needed for traditional RAIM.

In this regard, with only a roughly estimated a priori location of the receiver (e.g., within 1 km), the Doppler RAIM technique may efficiently hone in on the precise location. The a priori location may be ascertained by crude geolocation techniques (e.g., LTE triangulation, reception of a WiFi signal from a known location, etc.) or may be input by a user during setup or maintenance. If, however, the a priori location is incorrect by a large margin (e.g. 3 km), the receiver may reject the calculated position. This may occur through checking the integrity of each signal using the Doppler RAIM technique, and ultimately discarding each signal as unsatisfactory as compared to a predetermined threshold value (e.g., 1 Hz). Meaning, that if a signal is expected at 150 Hz, but received at 152 Hz, a 1 Hz threshold would lead to the receiver rejecting that signal.

In another aspect of the present invention, narrow Doppler bins are used to identify the frequency at which a signal is received at a GNSS receiver. In this regard, when a signal is received, a receiver determines the "bin" into which the obtained signal falls. Each of several bins is associated with a range of signal frequencies. In traditional receivers, bins typically cover a range of around 500 Hz. Thus, a given receiver may have 4 bins, for example. One that is 0-500 Hz, one that is 501-1000 Hz, one that is 1001-1500 Hz, and one that is 1501-2000 Hz. In this regard, a 700 Hz received signal would be identified by the receiver as falling with the range of the second bin. Thus, the signal is broadly categorized (e.g., between 501-1000 Hz) but the frequency is not specifically identified. This may reduce the computational resources required at a receiver by reducing the calculations needed to search a frequency search space for signal acquisition. However, such generic classification of the signal may be insufficient for implementation of the Doppler RAIM technique disclosed herein. To illustrate, a signal may be broadcast from a satellite at 1500 Hz. That signal may be expected by a receiver to be received at 1400 Hz given the geometry associated with the a priori location of the receiver and the known location and trajectory of the transmitter. If the signal is actually received at 1450 Hz, that fact may be indicative of a serious integrity concern with the signal. However, traditional receivers may not be capable of identifying the difference between a 1400 Hz signal and a 1450 Hz signal because both are associated with the same Doppler bin (i.e., 1001-1500 Hz).

In contrast, the Doppler bins of a receiver implementing the current invention may be relatively narrow compared to previously proposed solutions. Bins may be as narrow as 1 Hz, 0.6 Hz, 0.5 Hz, 0.25 Hz, or 0.01 Hz as non-limiting examples. In this regard, by identifying the Doppler bin into which the obtained signal falls, the receiver may determine, with a great deal of accuracy, the frequency of the signal. In this regard, a receiver using the Doppler RAIM technique disclosed herein may determine that a signal was expected to be received at 1400 Hz but was in fact received at 1405 Hz and therefore it lacks sufficient integrity to be trusted for location purposes based on an appropriate threshold value. Thus, as a result of the narrow Doppler binning technique, a receiver may be able to quickly and efficiently identify signals with compromised integrity, and therefore, may preclude using those signals in subsequent calculations. By reducing the number of signals used, the receiver may be able to drastically simplify the subsequent calculations and thereby reduce the computational expense associated with previously proposed techniques.

Also contemplated herein are improved techniques for accurate location of a receiver which may facilitate further location-based functionality for devices associated with or in communication with the located receiver. For instance, a receiver may be in operative communication with a device to be located, e.g., they may be integrated or networked. Receivers contemplated herein may include small cell communication nodes, VoIP telephones, network infrastructure, or any other devices benefiting from GNSS location. Furthermore, a receiver may be associated with communication nodes that may further provide location determination for devices within a monitored environment. This may be useful to facilitate location-based services for the devices even when located indoors or in other environments that may present difficulty with direct reception of GNSS signals at the device itself. One particular non-limiting example of a location based service may be location reporting for emergency calls originating from devices within the monitored environment.

In another aspect of the present invention, a receiver may calculate a number of candidate pseudo-range distances for a single satellite, each based upon a distinct interval of the received signal, and select the candidate pseudo-range distance with the greatest apparent integrity to serve as the actual pseudo-range distance in geolocation calculations. To illustrate, a satellite may transmit a signal which repeats every 1 millisecond (1 ms). A receiver may calculate a candidate pseudo-range for a first 1 ms interval, then calculate a candidate pseudo-range for a second 1 ms interval which is different than the first 1 ms interval. This process may repeat for any period of time. In some instances, a receiver may repeatedly calculate candidate pseudo-ranges for a given signal and pool the candidate pseudo-ranges which have been calculated during the previous few milliseconds, few seconds, or even few minutes. It may be impractical to pool candidate pseudo-ranges that are calculated over a period of more than a few minutes because the satellite is likely to traverse a significant distance over such a long period of time which will change the pseudo-range distance.

During a relatively short interval (e.g., less than about 10 ms, less than about 5 ms, less than about 3 ms, or less than about 1 ms), the candidate pseudo-ranges calculated should theoretically be almost identical because the satellite will not traverse a significant distance during such a short interval. In reality, there may be substantial differences in the candidate pseudo-ranges due to biases, interference, multi-path reflection, etc. Additionally, an erroneous Doppler value may be calculated when a signal's signal-to-noise ratio ("SNR") is relatively low, causing a correlation peak (as discussed below) to indicate an erroneous Doppler bin. Therefore, in the proposed process of filtering the candidate pseudo-ranges, a receiver may calculate a SNR for each of the candidate pseudo-ranges within a pool. A high SNR may generally be understood as an indicator of high integrity. Initially, the candidate pseudo-range with the highest SNR may be considered the signal with the greatest integrity. However, the following steps may result in another candidate pseudo-range being selected instead.

The receiver may select a number of candidate pseudo-ranges with the highest SNRs, for example, five candidate pseudo-ranges. A range of frequencies may be established which encompasses and is bounded by the frequencies at which the signal was received during the intervals which generated the five selected pseudo-ranges (e.g., the first 1 ms, the sixth 1 ms, etc.). Any other candidate pseudo-ranges from the pool that were received at a frequency within a given margin, for example 1 Hz, from the previously established range may also be considered. This is because any signal within the margin (e.g., 1 Hz) may be considered acceptable based upon those intervals' Doppler shifts being similar to the Doppler shift of the high SNR intervals. Notably, mixing values from other time epochs (e.g., in non-coherent integration techniques) may be acceptable as long as they fall within an acceptable tolerance of the local oscillator's stability (e.g., within 1 min., within 5 min., within 20 min.). From all of the pseudo-ranges still under consideration (i.e., those within the margin of the established range of frequencies), the pseudo-range demonstrating the shortest distance may be selected as having the greatest integrity. This is because the shortest distance pseudo-range is the most likely to have taken a direct path rather than having been reflected. Notably, if the selected pseudo-range corresponds to an unacceptably low SNR, it may be disregarded. For example, a threshold SNR may be established based upon a certain tolerance allowed from the highest SNR pseudo-range.

BRIEF DESCRIPTION OF THE DRAWINGS

FIG. 5 is a table of results from an empirical implementation of the Doppler RAIM technique.

DETAILED DESCRIPTION

While this disclosure is susceptible to various modifications and alternative forms, specific embodiments thereof have been shown by way of example in the drawings and are herein described in detail. It should be understood, however, that it is not intended to limit the disclosure to the particular form disclosed, but rather, the disclosure is to cover all modifications, equivalents, and alternatives falling within the scope as defined by the claims.

Figure 1:
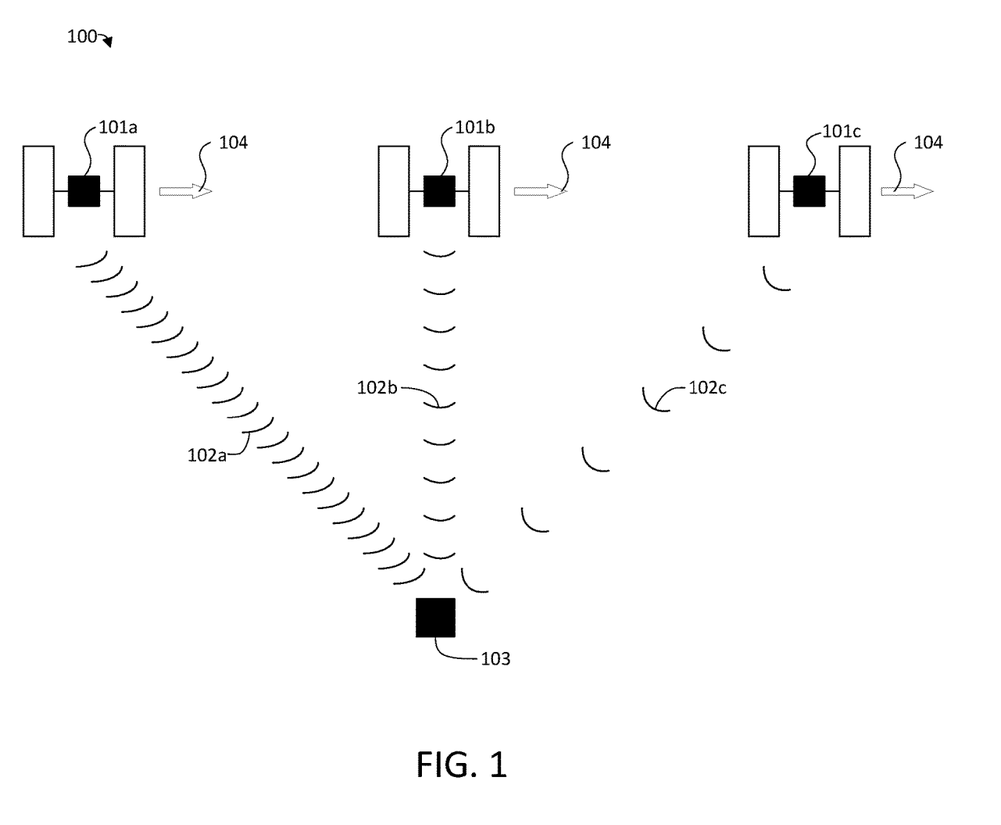
FIG. 1 is an illustration of GNSS signals being affected by the Doppler effect.

FIG. 1 is a visual depiction of a satellite system 100 illustrating the Doppler effect on the frequency of a signal 102. Transmitters 101a, 101b, and 101c may represent the same satellite in different positions at different respective moments in time or they may represent three different satellites at the same time broadcasting at the same frequency. In either regard, the transmitters 101a, 101b, and 101c may be travelling at a velocity 104. The receiver 103 may be stationary. Although the transmitters 101a, 101b, and 101c may be broadcasting a signal 102 at the same frequency, the effect of the velocity 104 on the signal 102 is visually depicted with each arc of the signal 102 denoting a given feature of a wave pattern (e.g., a wave crest). Thus, the relatively short distance between waves of signal 102a indicates a higher frequency along the path between transmitter 101a and receiver 103 than the lower frequency of signal 102b along the path between transmitter 101b and receiver 103, and a still lower frequency of single 102c along the path between transmitter 101c and receiver 103.

As transmitter 101a moves nearer to the receiver 103, each subsequent wave of the signal 102a is sent from a location nearer to the receiver 103 than the previous wave and has a shorter path to the receiver 103. In this regard, the waves of the signal 102a are compressed along the path between transmitter 101a and the receiver 103 causing an increased frequency of the signal 102a. In contrast, each subsequent wave of the signal 102c is sent from transmitter 101c at a position further from the receiver 103 than the previous wave. In this regard, the waves of the signal 101c are spaced farther apart along the path from transmitter 101c to the receiver 103 and are perceived at a lower frequency than the actual frequency at which the transmitter 101c is broadcasting. The transmitter 101b may be at a position directly over the receiver 103 such that the direction of its trajectory is perpendicular to the path of signal 102b. Therefore, at the moment in time at which this geometry occurs, the signal 102b experiences no Doppler shift and the frequency of signal 102b is consistent with the actual frequency at which transmitter 101b is broadcasting.

Figure 2:
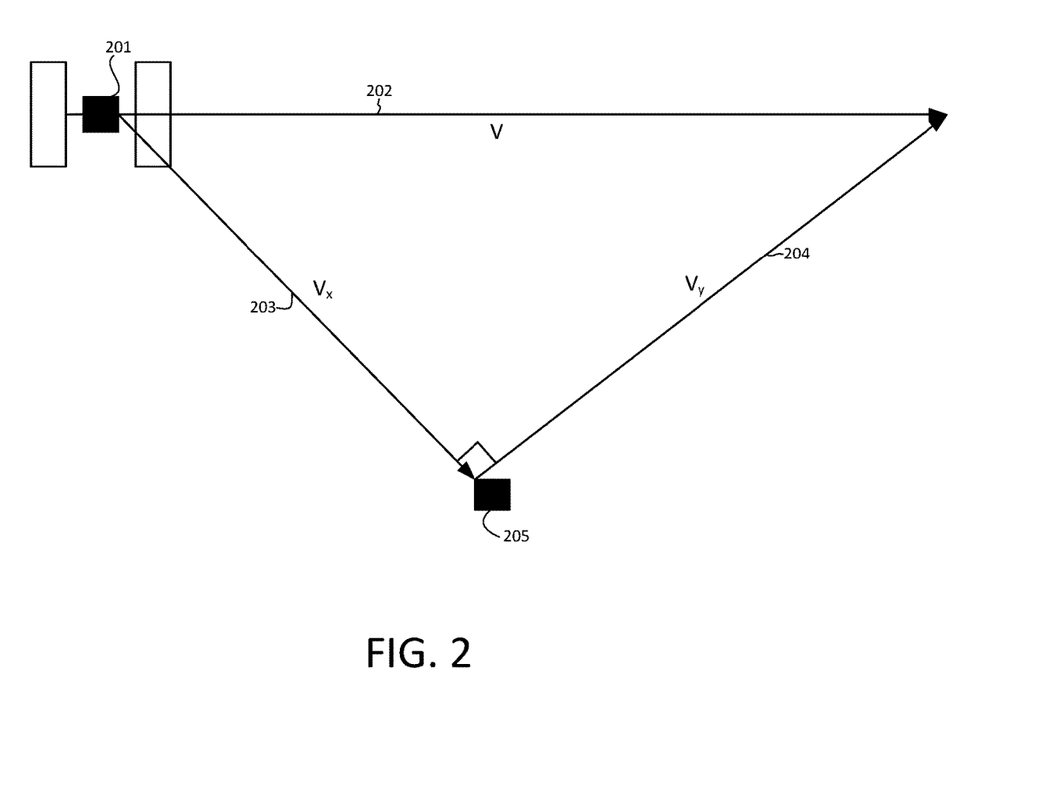
FIG. 2 is an illustration of the geometry associated with calculating an expected Doppler value.

FIG. 2 illustrates an embodiment of a geometry associated with calculating the Doppler shift of a signal. Transmitter 201 may have a velocity vector V 202. The velocity vector V 202 may be broken down into an x-component, $V_x$ 203, and a y-component, $V_y$ 204. In the illustration, $V_x$ 203 may be collinear with the line-of-sight path from the transmitter 201 to the receiver 205. In this regard, the magnitude of the velocity vector V 202 in the x-direction can be calculated as explained further below in order to determine the expected Doppler shift along the line-of-sight path to the receiver 205 to produce an expected Doppler value.

Each GNSS receiver (e.g., receiver 205) may be able to compute pseudo-ranges and correlation values for each GNSS satellite from which it receives signals. The pseudo-ranges, correlation values, and relative geometry may be used to calculate a best GNSS solution. In the context of geolocation, approaches that use iterative convergence (e.g., Newton-Raphson type approaches) may be used to resolve a location. Specifically, in the context of GPS solutions, a unit vector between a space vehicle 201 and a receiver 205 may be defined. Such a unit vector may be calculated based on the information encoded in a GPS signal received from a space vehicle (e.g., ephemeris data). Specifically, a variable $dcos_n$ may be defined for a receiver relative to a given space vehicle n that represents the unit vector between the space vehicle (e.g., transmitter 201) and the receiver (e.g., receiver 205). Specifically the unit vector $dcos_n$ may be defined as:

$$dcos_n = \frac{(x - sat_n(x), y - sat_n(y), z - sat_n(z))}{|(x - sat_n(x), y - sat_n(y), z - sat_n(z))|}$$

where x is the position in the x-dimension of the receiver, y is the position in the y-dimension of the receiver, z is the position in the z-dimension of the receiver, $sat_n(x)$ is the position of space vehicle n in the x-dimension, $sat_n(y)$ is the position of space vehicle n in the y dimension, and $sat_n(z)$ is the position of space vehicle n in the z dimension. The division by the absolute value of the quantity in the denominator is a convention to address sign convention of the variable $dcos_n$.

As may be appreciated, for each set of observables a new location of a receiver may be determined. Presumably, upon improved resolution of the position of a receiver, the accuracy of the calculation based on new observables will improve such that each successive solution will tend to converge to an actual determined location for the receiver.

Figure 3:
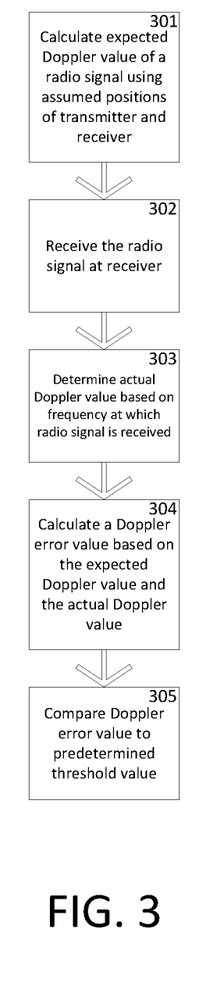
FIG. 3 is a flow chart of a method of assessing signal integrity of a single signal.

Turning to FIG. 3, a flowchart is shown which depicts steps for assessing a signal's integrity using the Doppler RAIM technique described herein. Given that an a priori location of a receiver may be assumed, and that the location of a transmitter is known from ephemeris data transmitted therefrom, an expected Doppler value may be calculated 301. The expected Doppler value may take into consideration the Doppler shift that is expected to occur given the geometric considerations discussed above. An expected Doppler value may be, for example, a frequency at which a signal is expected to be received or may be a difference between a frequency at which a signal is broadcast and a frequency at which the signal is expected to be received. Upon receiving a signal at a receiver 302, an actual Doppler value may be obtained by determining the frequency at which the signal has been received 303. This may achieved, for example, by identifying the Doppler bin with which the signal is associated when received. The actual Doppler value may comprise the frequency at which the signal is received or it may comprise a difference between the frequency at which the signal is received and the actual frequency at which the signal is broadcast by the transmitter. Once the expected Doppler value and the actual Doppler value are known, a Doppler error value may be calculated 304. A Doppler error value may be, for example, at least in part based on the difference between the expected Doppler value and the actual Doppler value. A large Doppler error value may be indicative of low signal integrity such that the signal is unreliable for calculating a pseudo-range. Therefore, a Doppler error value can be compared to a threshold value which is associated with an acceptable level of discrepancy 305. The threshold value may be programmed into a receiver during manufacturing, manually input by a user, or may be calculated by the receiver (e.g., as a function of signals received over some period of time, such as an average of all error values experienced over the previous 24-hour period). The threshold value may be indicative of an acceptable difference between an expected Doppler value of a signal and the actual Doppler value of the signal.

Figure 4:
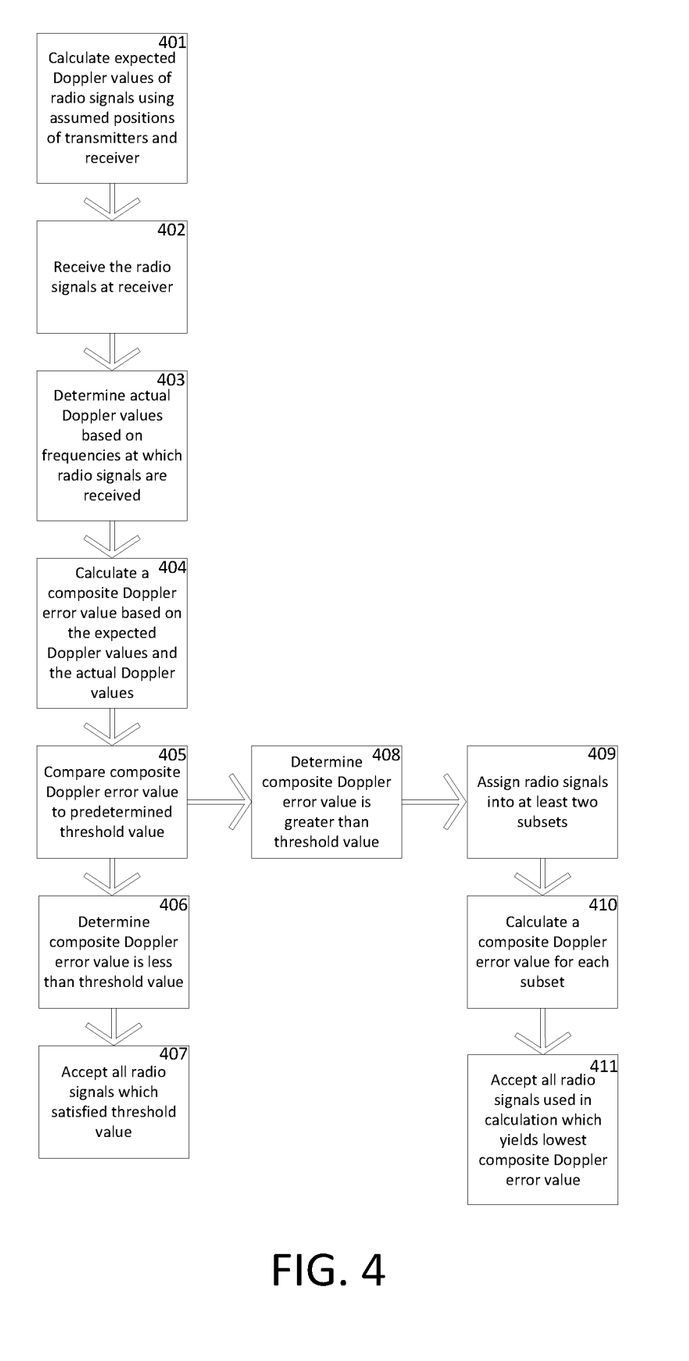
FIG. 4 is a flow chart of a method of assessing signal integrity of a plurality of signals by separating them into subsets.

FIG. 4 is a flowchart describing a method for determining the integrity of a set of signals. The locations of a plurality of satellites may be determined using ephemeris and almanac by calculating at least one composite Doppler error value. Using this information along with an a priori location of a receiver, an expected Doppler value may be calculated for each of the signals 401. Upon receiving the signals at the receiver 402, actual Doppler values associated with the frequencies of the signals as received can be determined, for example, using Doppler binning 403. By comparing the actual Doppler values to the expected Doppler values, a composite Doppler error value may be calculated 404 and compared to a known threshold value 405. If the composite Doppler error value is less than the threshold value 406, all of the radio signals may be considered acceptable 407. If however, the composite Doppler error value is greater than the threshold value 408, various subsets of radio signals may be formed 409. The subsets may be, for example, exclusive of one another or may comprise every combination of signal groupings available. A composite Doppler error value for each subset may be calculated 410. The subset(s) associated with a higher composite Doppler error value is more likely to contain a signal or signals with low integrity. Therefore, it may be preferable to select and use only the signals associated with the subset yielding the lowest composite Doppler error value 411.

FIG. 5 contains a set of empirical results from a simulation utilizing an approach similar to that of FIG. 4. The simulation used six SVs which were respectively assigned the pseudorandom noise numbers (PRNs) 11, 20, 22, 23, 31, and 32. The simulation was designed to introduce at least one fault (i.e., low-integrity signal from an SV) to allow the Doppler RAIM technique disclosed herein to be compared to previously disclosed RAIM techniques. A threshold value of 0.6 Hz was used for comparison to the calculated composite Doppler error values. Various subsets of PRNs were analyzed to determine a lowest possible composite Doppler error value associated with a subset of the given signals.

Each line of the empirical results represents a set of calculations for a given subset. Column 501 indicates the PRNs of the SVs which have been omitted from the calculations. That is to say, for example, the first line lists PRN 32 which indicates the subset of SVs used to calculate the values listed included PRNs 11, 20, 22, 23, and 31 but not PRN 32. Column 502 lists the residual value calculated for each subset using a traditional approach to RAIM. Column 503 lists the composite Doppler error value for each subset in accordance with the Doppler RAIM technique disclosed herein. Column 504 indicates the bias associated with each subset. In a real-world implementation, the bias listed in column 504 may be indicative of oscillator drift and may be used to synchronize the clock of the receiver.

The simulation may have been performed in a number of different manners. For example, in a first manner, each possible subset containing five SVs was analyzed and the resulting composite Doppler error values (as shown in column 503) were compared to the threshold value (i.e., 0.6 Hz). Based upon the composite Doppler error values of all subsets exceeding the threshold value, each possible subset containing four SVs was analyzed and the resulting composite Doppler error values were compared to the threshold value. Based upon the composite Doppler error values of all subsets exceeding the threshold value, each possible subset containing three SVs was analyzed and the resulting composite Doppler error values were compared to the threshold value. Based upon at least one composite Doppler error value falling below the threshold, no further subsets (i.e., those with only two SVs or one SV) were assigned and the subset with the lowest composite Doppler error value (i.e., the subset associated with line 505) was selected.

A second manner of performing the simulation may have more closely aligned with the method described in FIG. 4. In this regard, the simulation may have initially calculated a composite Doppler error value for the set of all SVs and compared that value to the threshold. The receiver may have then determined that the composite Doppler error value exceeded the threshold value. Thereafter, the receiver may have generated every possible subset of SVs and calculated a composite Doppler error value for each and every subset. The subset associated with the lowest composite Doppler error value may have been selected. To clarify, this second manner of performing the simulation differs from the first manner in that all possible subsets may initially be evaluated rather than evaluating only subsets with one SV removed and then moving on to subsets with two SVs removed only if all subsets with one SV removed fail to meet the threshold value requirement.

Notably, the traditional approach to RAIM associated with previously disclosed methods would have led to selection of the subset associated with line 506 as having the greatest integrity. However, that selection would have been incorrect. As it turns out, there was a triple fault introduced into the simulation. That is to say, three of the signals were of low-integrity and therefore not suitable for geolocation calculations. However, as mentioned above, the traditional approach to RAIM is unable to determine which three signals out of a set of six signals are of low-integrity because at least four acceptable-integrity signals are needed to make such a determination. In contrast, the Doppler RAIM technique described herein was able to, in the simulation, identify that the subset associated with line 505 has the highest composite integrity despite only three SVs remaining in the subset. According to the values reported in line 505, the signals from the three SVs having the PRNs 31, 11, and 23 are low-integrity signals. By omitting these three signals, a composite Doppler error value of 0.045958 Hz was calculated, which meets the threshold value of 0.6 Hz. Therefore, the subset containing only the SVs with PRNs 20, 22, and 32 yielded the highest composite integrity and is most suitable for geolocation calculations.

Notably, had none of the three SV subsets yielded a composite Doppler error value below the threshold value, the Doppler RAIM technique may have been able to assign signals to subsets of two SVs, and if necessary, subsets of one SVs in order to generate a subset with a composite Doppler error value which satisfies the threshold value.

Figure 6:
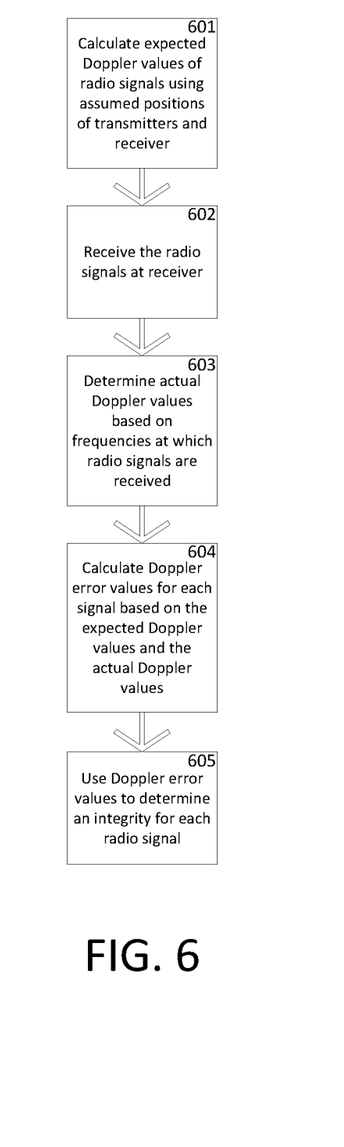
FIG. 6 is a flow chart of a method of assessing signal integrity of a plurality of signals by evaluating each one individually.

FIG. 6 is a flowchart describing a method for determining the integrity associated with each of a plurality of signals. The locations of a plurality of satellites are determined using ephemeris and almanac data. Using this information along with an a priori location of a receiver, an expected Doppler value may be calculated for each of the signals 601. Upon receiving the signals at the receiver 602, actual Doppler values associated with the frequencies of the signals as received can be determined, for example, using Doppler binning 603. By comparing the actual Doppler values to the expected Doppler values, a Doppler error value may be calculated for each of the signals 604. Each Doppler error value may then be analyzed, for example by comparing to a threshold value, to determine an integrity of the corresponding signal 605.

Figure 7:
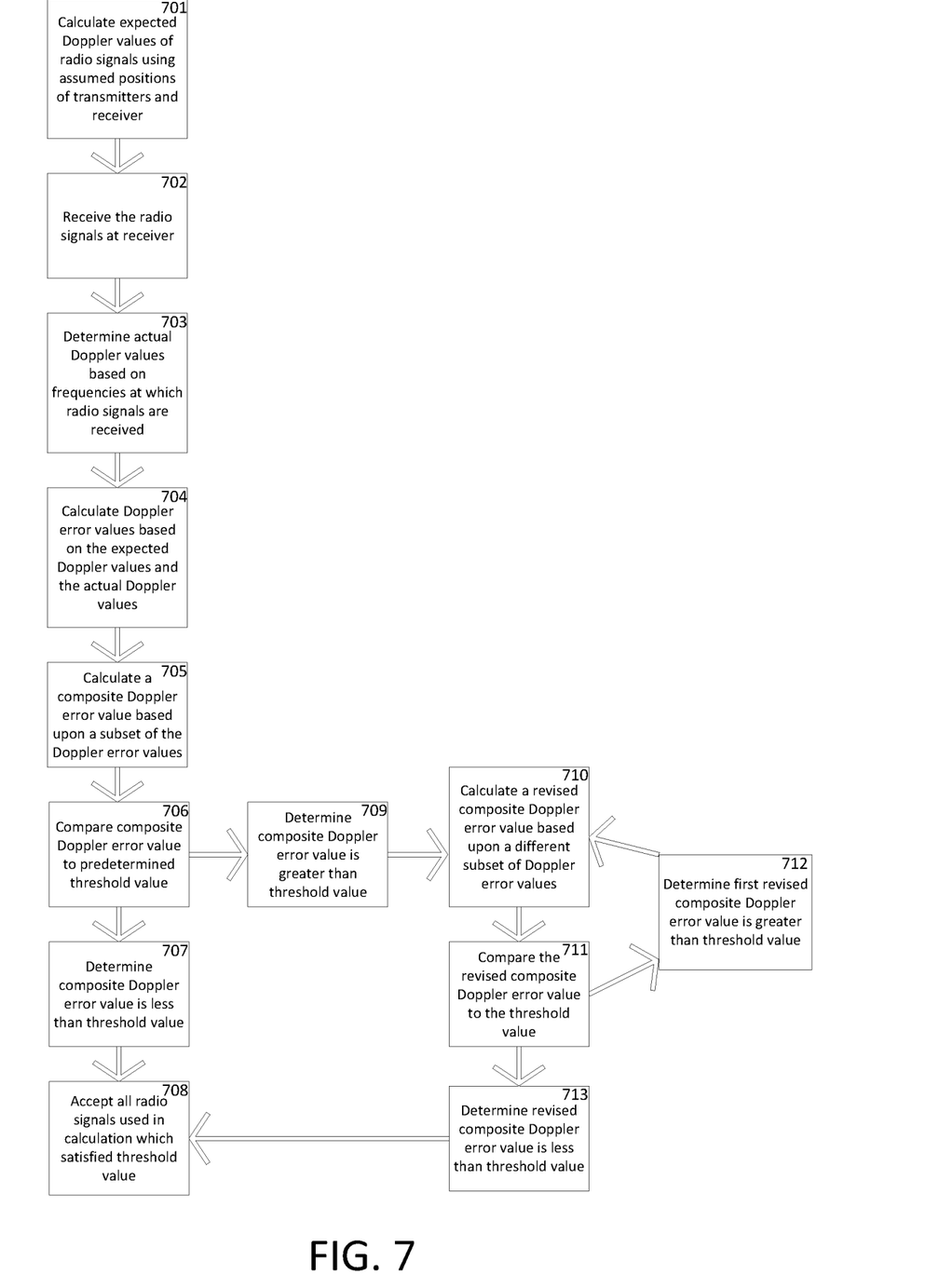
FIG. 7 is a flow chart of a method of assessing signal integrity of plurality of signals through an iterative process of evaluating various subsets.

FIG. 7 is a flowchart describing an iterative method for determining an acceptable subset of signals based on integrity. The locations of a plurality of satellites are determined using ephemeris and almanac data received with the signals. Using this information along with an a priori location of a receiver, an expected Doppler value may be calculated for each of the signals 701. Upon receiving the signals at the receiver 702, actual Doppler values associated with the frequencies of the signals as received can be determined, for example, using Doppler binning 703. By comparing the actual Doppler values to the expected Doppler values, a Doppler error value may be calculated for each of the signals 704. Using the Doppler error values, a composite Doppler error value may be calculated for a subset of the signals 705 and compared to a known threshold value 706. If the composite Doppler error value is less than the threshold value 707, all of the radio signals in the subset may be considered acceptable 708. If however, the composite Doppler error value is greater than the threshold value 709, a new subset of signals may be assigned and a revised composite Doppler error value calculated therefrom 710. The revised composite Doppler error value may then be compared to a threshold value 711. If the revised composite Doppler error value also exceeds the threshold value 712, then a new subset of signals is assigned and a new revised composite Doppler error value may be calculated 710. If however, it is determined that the revised composite Doppler error value is less than the threshold value 713, all of the signals used in calculating that revised composite Doppler error value may be accepted 708.

Figure 8:
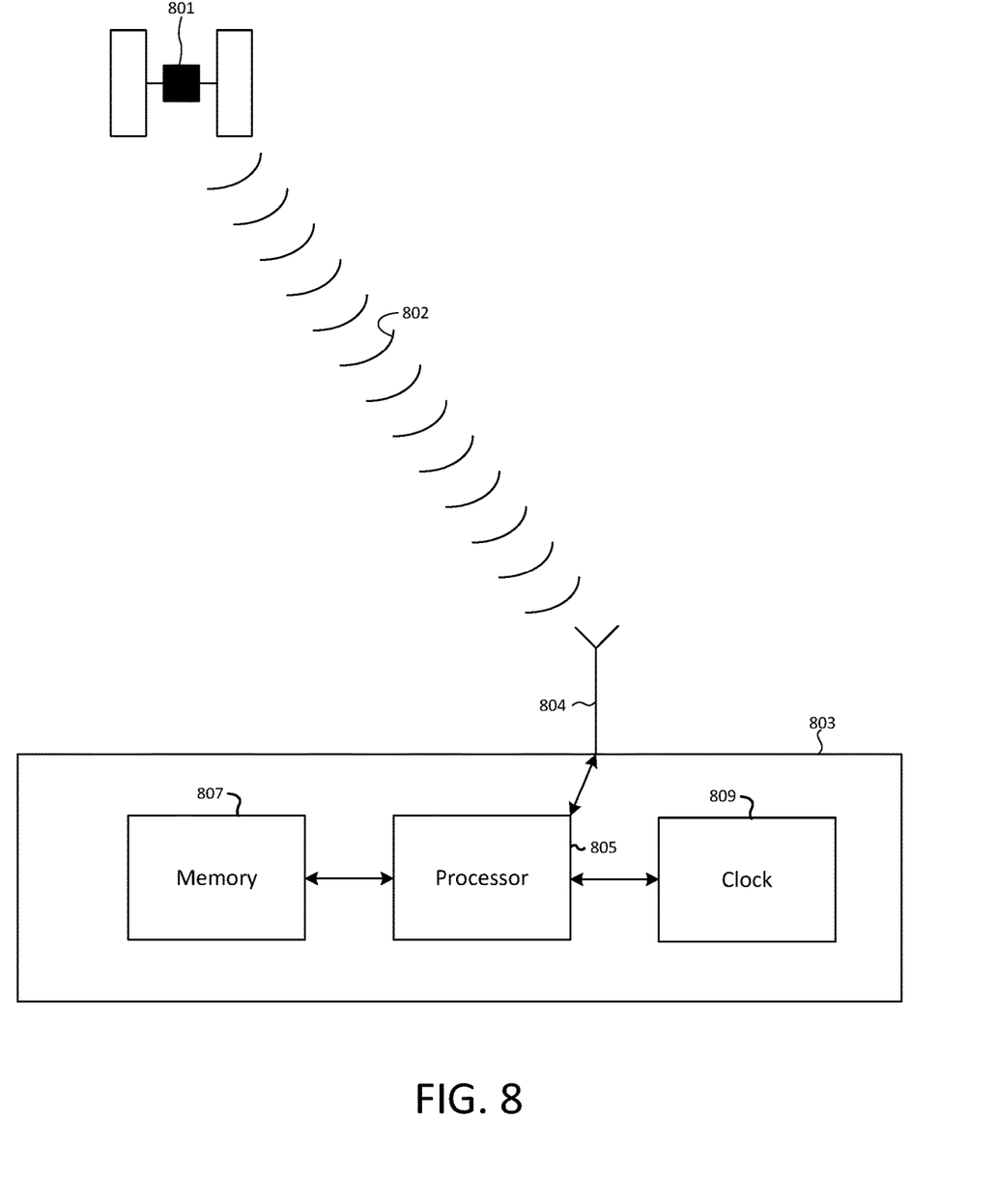
FIG. 8 is an illustration of a system including a receiver for performing Doppler RAIM.

FIG. 8 is a schematic illustration of an embodiment of a receiver 803. An antenna 804 associated with the receiver 803 may be operable to receive a signal 802 from a transmitter 801, for example, a satellite. A processor 805 may be in operative communication with the antenna 804. The processor 805 may also be in operative communication with a memory 807 and with a clock 809.

Doppler binning algorithms may be stored in the memory 807 for use by the processor 805 in determining the frequency of, and subsequently the actual Doppler value associated with, a signal 802 as received. Either before or after determining the frequency of the signal 802, the processor 805 may calculate an expected Doppler value for the signal 802 based at least in part on ephemeris and almanac data which may be received, for example, via the signal or through a backchannel such as a network connection. Having calculated the expected Doppler value and determined the actual Doppler value of the signal 802, the processor 805 may calculate a Doppler error value associated with the signal 802. Thereafter, the processor 805 may compare the Doppler error value to a threshold value stored in the memory 807.

Additionally, processor 805 may iteratively calculate Doppler values and pseudo-ranges by refining estimations of the clock's 809 bias. In this regard, each subsequent iteration may return a more accurate bias which in turn may enable processor 805 to increase the accuracy and precision of the location of the receiver 803.

It should be appreciated that received signals may be subjected to other processes before and/or after a Doppler RAIM method. Such processes may provide additional levels of filtering or integrity verification. As one example, a correlation peak analysis may be performed. During a correlation peak analysis, a reference signal designed to mimic the signal transmitted from a satellite may be generated by a receiver. The reference signal may then be compared to a received signal by shifting the signals forward or backward in time relative to another over a predetermined set of intervals. At each interval, a correlation value is determined which represents, in essence, the percentage of the reference signal which is in alignment with the received signal. Plotting the correlation values at each interval may yield a peak which corresponds to the sampled interval at which the reference signal is best aligned with the received signal. Generally speaking, data associated with the interval at which the peak occurs is considered optimal (at least within the available options) for use in a geolocation determination. However, in some implementations, a peak correlation threshold may be established for use in filtering signals. If the correlation peak of a given signal falls below the correlation peak threshold value, such a signal may be omitted from further calculations. In the context of the Doppler RAIM method described herein, a peak correlation threshold analysis may serve to filter out low-integrity signals before the Doppler RAIM method is implemented.

In this regard, the Doppler RAIM procedure may be simplified due to the reduced number of signals to be analyzed.

Similarly, after the Doppler RAIM procedure has been utilized to filter out low-integrity signals, additional processing may be performed before geolocation. One such additional process may involve joint-processing, an example of which is described in U.S. patent application Ser. No. 14/285,770 filed May 23, 2014 by Derbez which is incorporated herein by reference in its entirety. The technique disclosed therein involves storing a plurality of records comprising data associated with received signals over a relatively long period of time (e.g., between 1 to 300 seconds), such period of time, however, being short enough to assume that the received signals are subject to the same biases. That is to say, for example, it is unlikely that atmospheric conditions would change significantly enough to impact the atmospheric biases introduced upon a signal. By assuming a common bias applies to all records within a group of records, a sufficient number of variables may be eliminated to permit reasonably accurate calculation of pseudo-ranges with a small number of visible satellites (e.g., two satellites).

While throughout this document the term receiver has been used, it is intended to apply to any device capable of receiving GNSS signals. This may include dedicated GNSS receivers, smart phones, tablets, laptops, smart watches, gaming devices, and most modern consumer electronic devices. For example, in order to receive GNSS signals, it is typically required to have an antenna, a tuner, and a reasonable oscillator. The GNSS location calculations may be performed in the receiver or in some other processing/computing device associated therewith.

While the foregoing has illustrated and described several embodiments in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only a preferred embodiment and variants thereof have been shown and described and that all changes and modifications that come within the spirit of the disclosure are desired to be protected.

What is claimed:

1. A method for verifying integrity of a plurality of positioning system radio signals, comprising:
    calculating an expected Doppler value regarding a frequency at which each respective one of the plurality of positioning system radio signals is anticipated to be received based on an assumed location of a receiver and a respective transmitter for each of the plurality of positioning system signals;
    receiving the plurality of positioning system radio signals at the receiver;
    determining an actual Doppler value of each of the plurality of positioning system radio signals based on a frequency at which each of the plurality of positioning system radio signals is received;
    calculating a signal-to-noise ratio (SNR) for each of the plurality of positioning system radio signals;
    identifying candidate positioning system radio signals comprising positioning system radio signals received in a common Doppler bin to a predetermined number of positioning system radio signals having the largest SNRs of the plurality of positioning system radio signals, wherein the common Doppler bin has a frequency width of no more than 1 Hz;
    calculating a composite Doppler error value of a plurality of subsets of the candidate positioning system radio signals, each composite Doppler error value being indicative of all individual Doppler error values for a given subset corresponding to the difference between the expected Doppler value and the actual Doppler value for each candidate positioning system radio signal, wherein the plurality of subsets include less than four positioning system radio signals;
    comparing the composite Doppler error values for each of the plurality of subsets to a predetermined threshold value;
    if the composite Doppler error value for one or more of the plurality of subsets is less than the threshold value, confirming the integrity of the positioning system radio signals in the one or more plurality of subsets for which the composite Doppler error value is less than the threshold value and selecting a selected subset of the plurality of subsets that has a lowest composite Doppler error value that is less than the predetermined threshold; and
    disregarding positioning system radio signals which are not included in the selected subset as not having integrity.

2. The method of claim 1, wherein calculating an expected Doppler value comprises:
    calculating a vector between the transmitter and the receiver; and
    multiplying the vector by a component of the velocity of the transmitter along the vector.

3. A receiver, comprising:
    an antenna operable to receive a plurality of radio signals;
    a memory module operable to store a threshold value in computer readable format; and
    a processor in operative communication with the antenna and the memory module and operable to:
        calculate an expected Doppler value of each respective one of the plurality of radio signals;
        determine an actual Doppler value of each respective one of the plurality of radio signals, wherein the actual Doppler value is measured using Doppler bins having widths less than 1 Hz;
        calculate a signal-to-noise ratio (SNR) for each of the plurality of radio signals;
        identify candidate radio signals comprising radio signals received in a common Doppler bin to a predetermined number of radio signals having the largest SNRs of the plurality of radio signals;
        calculate a Doppler error value of each respective one of the candidate radio signals using the expected Doppler value and actual Doppler value of each respective one of the candidate radio signals;
        generate a composite Doppler error value of a combination of the candidate radio signals, the composite Doppler error value being calculated based on the Doppler error values of the combination of the candidate radio signals; and
        determine a reliability of the plurality of radio signals using the composite Doppler error value by comparing the composite Doppler error value to a predetermined threshold value, wherein integrity of the plurality of radio signals is confirmed if the composite Doppler error value is less than the predetermined threshold value and integrity of at least one of the plurality of radio signals is not confirmed if the composite Doppler error value is greater than the predetermined threshold value.

4. A method of integrity analysis of a plurality of radio signals each from a respective one of a plurality of transmitters, comprising:
- calculating a plurality of expected Doppler values regarding a frequency at which each respective one of the plurality of radio signals is anticipated to be received at a receiver based on an assumed location of the receiver and an assumed location of each of the respective ones of the plurality of transmitters, wherein each of the plurality of expected Doppler values corresponds to one of the plurality of radio signals sent from the respective one of the plurality of transmitters;
- receiving the plurality of radio signals at the receiver;
- determining a plurality of actual Doppler values corresponding to each of the plurality of radio signals;
- calculating a signal-to-noise ratio (SNR) for each of the plurality of radio signals;
- identifying candidate radio signals comprising radio signals received in a common Doppler bin to a predetermined number of radio signals having the largest SNRs of the plurality of radio signals, wherein the common Doppler bin has a frequency width of no more than 1 Hz;
- calculating a plurality of individual Doppler error values for each of the candidate radio signals based on respective expected Doppler values and actual Doppler values;
- calculating a first composite Doppler error value of a first subset of a first number of the candidate radio signals calculated based on the plurality of individual Doppler error values of the first subset of the candidate radio signals;
- comparing the first composite Doppler error value to a threshold value;
- if the first composite Doppler error value is less than the threshold value, confirming the integrity of the first subset of the first number of the candidate radio signals; and
- if the first composite Doppler error value is greater than the threshold value, calculating a second composite Doppler error value of a second subset of a second number of the candidate radio signals calculated based on the plurality of individual Doppler error values of the second subset of the candidate radio signals, wherein the second number of the candidate radio signals includes one less radio signal than the first number of the plurality of radio signals.

5. The method of claim 4, further comprising:
- calculating a plurality of second composite Doppler error values for each combination of the second number of the candidate radio signals, wherein more than one of the plurality of second composite Doppler error values for a given combination of the second number of the candidate radio signals is less than the threshold value;
- selecting the given combination of the candidate radio signals related to a lowest second composite Doppler error value;
- confirming the integrity of the candidate radio signals related to the lowest second composite Doppler error value; and
- disregarding radio signals which are excluded from the given combination of the candidate radio signals.

6. The method of claim 4, further comprising:
- establishing a threshold signal to noise ratio value;
- comparing the signal to noise ratio for each of the plurality of radio signals to the threshold signal to noise ratio value; and
- disregarding radio signals which do not meet the threshold signal to noise ratio value prior to performing the step of identifying candidate radio signals.

* * * * *